J. HECKEL.
PRISM BINOCULAR.
APPLICATION FILED JAN. 16, 1908.
959,739.
Patented May 31, 1910.
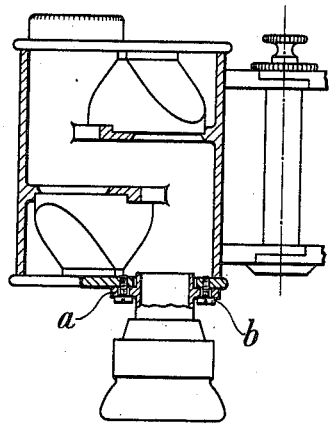
Fig.1
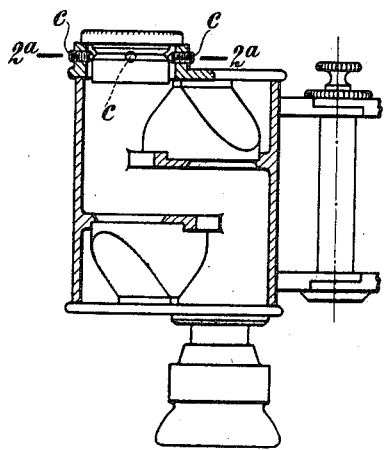
Fig.2
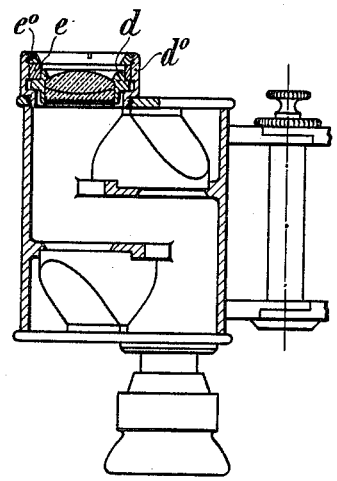
Fig.3
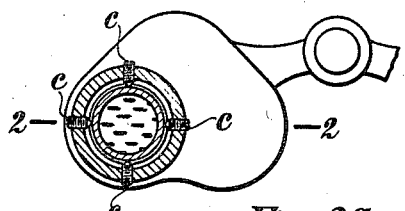
Fig.2ª
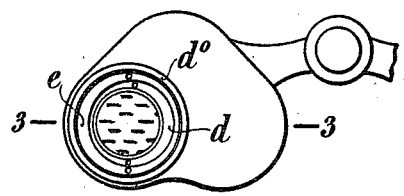
Fig.3ª
Witnesses:
Paul Krüger
Fritz Sander
Inventor:
Jakob Heckel

UNITED STATES PATENT OFFICE.

JAKOB HECKEL, OF JENA, GERMANY, ASSIGNOR TO THE FIRM OF CARL ZEISS, OF JENA, GERMANY.

PRISM-BINOCULAR.

959,739.

Specification of Letters Patent.   Patented May 31, 1910.

Application filed January 16, 1908.   Serial No. 411,106.

*To all whom it may concern:*

Be it known that I, JAKOB HECKEL, mechanician, a citizen of the German Empire, and residing at Carl-Zeiss strasse, Jena, in the Grand Duchy of Saxe-Weimar, Germany, have invented new and useful Prism-Binoculars, of which the following is a specification.

The invention consists in a new prism binocular of that kind, in which the single telescopes are connected together by a hinge for the purpose of adapting the distance between the oculars to the inter-pupillary distance of the observer. This instrument is provided with means for being adjusted so that its two optical axes are parallel to one another and remain so notwithstanding alteration of the distance between the oculars. As may be easily understood, the adjustment will fulfil the latter condition, if the optical axis of either single telescope be directed parallel to the axis of the hinge. This has hitherto been attained by having the position of the single telescope suitably altered relatively to the hinge, a method which is, however, of limited applicability, because it is based upon a detachable connection existing between the casing of the single telescope and its hinge arms.

The adjusting means according to the present invention may be applied to prism binoculars of every kind, because it does not affect the position of the single telescope casing with regard to the hinge and also does not otherwise materially restrict freedom in the build of the binocular. This adjusting means is connected with one of the two component lens systems, either the objective or the ocular, in such a way that the place of the component lens system may be varied in the plane perpendicular to the axis of the hinge.

In the annexed drawing: Figure 1 represents part of a prism binocular, the mounting of the ocular being constructed according to the invention. Fig. 2 represents part of another prism binocular and is a section on the line 2—2 in Fig. 2ª, the mounting of the objective being constructed according to the invention. Fig. 2ª is a section on the line 2ª—2ª in Fig. 2. Fig. 3 represents part of a third prism binocular with another objective mounting according to the invention and is a section on the line 3—3 in Fig. 3ª. Fig. 3ª is a plan view of the same form, an annular fastening nut being removed from the mounting of the objective.

It will be understood that varying the place of one of the component lens systems of a single telescope in the plane perpendicular to the hinge axis of the double telescope produces a variation of the direction of the optical axis of the single telescope as required for the purpose of rendering this axis parallel to that of the hinge. The direction of the optical axis is given—in all telescopes the magnification of which deviates from unity—by the direction of entrance of that pencil of parallel rays the final deflection of which through the telescope is zero, that is to say, which also leaves the instrument in the direction of entrance. Rays from a point which lies on the axis of the hinge at a very great distance away enter either single telescope parallel to the axis of the hinge. If these rays also emerge parallel to the said axis, the optical axis of either single telescope has the required direction. In every other case at least one optical axis is to be rotated correspondingly. The amount of shifting to be undertaken for this purpose with the ocular or the objective in the plane perpendicular to the hinge axis is found to be the product of two factors, one of which is the sum of the focal distances both of the objective and the ocular and the other is the tangent of the angle of inclination of the optical axis to the axis of the hinge.

In order to conveniently adjust the ocular tube or the objective by shifting it, while the rotation of the optical axis produced thereby is being observed, and hereafter fasten it on the casing of the single telescope, the mount of the objective or the ocular tube may have, as shown in Fig. 1 with respect to the latter, a flange $a$ with holes for screws $b$, these holes being comparatively wide so as to allow transverse shifting of the tube when the screws are loosened. Other well known means may be employed for the same adjustment, for example as shown in Figs. 2 and 2ª screws $c$ working crosswise in two directions, or as shown in Figs. 3 and 3ª a double eccentric consisting of a lens mount $d$ with an outer eccentric surface and a ring $e$ rotatably fitted in the objective casing $d^0$ and also—with an inner eccentric surface—on the lens mount $d$, an annular nut $e^0$ being provided for fastening the double eccentric as adjusted.

I claim:

1. In a hinged prism binocular the combination, in each of the single telescopes, with the prism system and the two component lens systems, of means for adjusting one of the component lens systems in a plane perpendicular to the axis of the hinge.

2. In a hinged prism binocular the combination, in each of the single telescopes, with the prism system and the two component lens systems, of a double eccentric for adjusting one of the component lens systems in a plane perpendicular to the axis of the hinge.

3. In a hinged prism binocular the combination, in each of the single telescopes, with the prism casing, of an ocular connected with the prism casing, an objective casing fastened to the prism casing, an objective lens mounted in an eccentric ring, another eccentric ring rotatably fitted on the eccentric lens mount and also in the objective casing, and means for fixing the objective parts as adjusted.

JAKOB HECKEL.

Witnesses:
PAUL KRÜGER,
FRITZ SANDER.